(12) United States Patent
Renyolds

(10) Patent No.: US 6,657,419 B2
(45) Date of Patent: Dec. 2, 2003

(54) MICRO-SOLAR INSOLATION CIRCUIT

(75) Inventor: Robert Lee Renyolds, Ventura County, CA (US)

(73) Assignee: Solarmate Corporation, Redondo Beach, CA (US)

( * ) Notice: Subject to any disclaimer, the term of this patent is extended or adjusted under 35 U.S.C. 154(b) by 17 days.

(21) Appl. No.: 09/992,225

(22) Filed: Nov. 19, 2001

(65) Prior Publication Data

US 2003/0094931 A1 May 22, 2003

(51) Int. Cl.[7] .................................................. G05F 1/40
(52) U.S. Cl. ........................................................ 323/285
(58) Field of Search ................................ 323/265, 268, 323/271, 282, 285, 286, 289, 290; 363/21.06, 21.14, 21.1, 21.11, 21.17, 21.18

(56) References Cited

U.S. PATENT DOCUMENTS

| | | | | |
|---|---|---|---|---|
| 5,504,418 A | * | 4/1996 | Ashley | ........................ 323/282 |
| 5,986,354 A | * | 11/1999 | Nagao et al. | .................. 307/64 |
| 6,031,736 A | * | 2/2000 | Takehara et al. | ............... 363/21 |
| 6,046,896 A | * | 4/2000 | Saeki et al. | .................... 361/86 |
| 6,051,954 A | * | 4/2000 | Nagao et al. | ................ 320/101 |
| 6,307,360 B1 | * | 10/2001 | Kajiwara et al. | ........... 323/282 |

\* cited by examiner

Primary Examiner—Matthew V. Nguyen
(74) Attorney, Agent, or Firm—Philip T. Virga

(57) ABSTRACT

A micro-solar insolation circuit having a boost regulator or DC—DC converter used to transfer the power available from a solar cell source, at a value close to its optimum, to a load is provided. The micro-solar insolation circuit comprises a comparator for generating an error signal based on a solar cell reference voltage wherein a modulator controller receives the error signal and changes its duty cycle based on the error signal. The modulator controller controls a high-speed switch in association with a synchronous rectifier for loss-less current limiting.

20 Claims, 2 Drawing Sheets

MICRO-SOLAR INSOLATION CIRCUIT

This invention relates to boost regulator or DC—DC converter circuits utilizing an insolation technique for operating a current limited power supply at or near its maximum power point. The use of an insolation circuit, in accordance with the present invention, is to accommodate solar applications in portable electronic devices, such as cellular phones and the like, which mandate special requirements in terms of power consumption, efficiency, voltage threshold, available space and cost. It is the intention of this disclosure to demonstrate a unique application of micro-solar insolation that meets these requirements for portable electronic devices. The invention provides for a matching impedance which can be designed to reactively change value to maintain an electrical match to a power generating device during varying conditions of operation or power generation such that maximum power transfer is maintained.

DETAILED DESCRIPTION OF THE DRAWINGS

Figure 1:
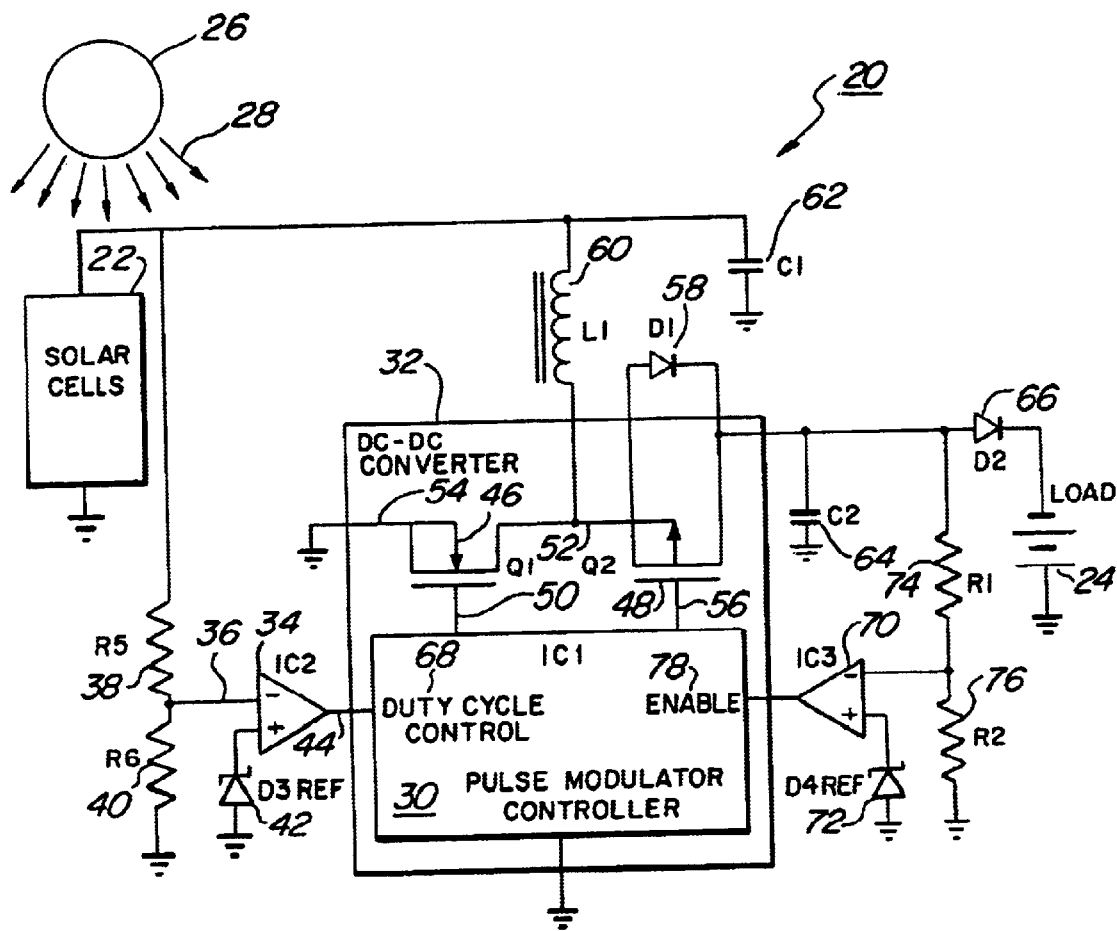
FIG. 1 is a high-level electrical circuit diagram of an insolation circuit in accordance with the present invention.

FIG. 1 is a high-level electrical circuit diagram of an insolation circuit 20 in accordance with the present invention. The insolation circuit 20 couples either a single or an array of solar cells 22 to a load or battery 24. The internal impedance of the solar cells 22 varies with the intensity of solar radiation 28 it receives from the sun 26. Also, the battery's internal impedance changes with the amount of battery charge. In prior-art systems, solar cells 22 were connected directly to battery 24 and the configuration of either or both solar cells 22 and the battery 24 were adjusted in an attempt to match their impedance at a particular level of sunlight intensity and/or battery charge. Normally, this level was the maximum solar intensity, which occurs on a clear day with the sun optimally overhead. At this time, near maximum power transfer occurred from the solar cells 22 to the battery 24 for a given battery charge. However, when the solar radiation 28 was less than optimal (morning, evening, or partially cloudy) the impedance of the solar cells 22 increased, so that substantially less than all of the solar energy converted by the solar cells 22 was received by the battery 24. Similarly, as the battery charge changed so does the battery internal impedance creating a mismatched impedance condition between the solar cells 22 and the battery 24 resulting in a decrease of the percent of power transfer.

By way of example only, the typical output voltage of a single "open" array of solar cells 22 at full sun is approximately 2.0 volts. Nominally the required cell phone battery charge voltage for a load 24 is somewhere between 2.2 to 4.2 volts. This requires a "boost" converter (referred to as a DC—DC converter) between the solar cells 22 and the battery 24 or a battery charger (not shown). Micro-power boost converters are commercially available with efficiency ratings around 70% to 95%. However, simply connecting a solar cell to a battery through a DC—DC converter fails to deliver the available power to the battery load due to mismatched impedance conditions. The battery is essentially a low impedance load and the DC—DC converter is designed to match a low impedance source to a low impedance load. The solar cell impedance or more precisely, series resistance, even at full sun, is nominally higher than the DC—DC converter and battery combination and results in a condition that fails to deliver full power to the load or battery. This condition normally appears as a pull-down or loading of the source voltage. Since the source impedance or solar cell series resistance is higher than that of the load, a substantial amount of voltage (and therefore power) will drop across the solar cell series resistance and never be delivered to the load.

Therefore, a problem exists in determining and regulating the set point for the solar array voltage under changing conditions of solar flux or solar insolation so as to not pull-down or overload the solar power source. Many methods have been employed for regulating solar array voltage in macro systems but they require extensive circuit complexity to achieve. Extensive circuitry increases the demands for available space, cost, and increases power consumption. For example, a solar embodiment to a cell phone battery pack may include a solar cell, a battery, a battery charger, a battery protection unit, a DC—DC converter, and an insolation circuit. All of this circuitry must fit into an ever-decreasing sized package and maintain an ever-decreasing quiescent current draw. The components must be extremely small, low loss and yet be capable of delivering maximum solar energy to the battery. In accordance with the present invention, FIG. 1 illustrates a schematic of a "voltage regulation" insolation circuit 20 that solves the above-described solar insolation problem. The "voltage regulation" insolation circuit 20 (hereinafter insolation circuit) provides a simple and economical solar insolation solution requiring minimal parts count and current draw and yet achieves a high degree of power efficiency.

Referring once again to FIG. 1, the insolation circuit 20 insures optimal energy transfer by matching load conditions according to the output impedance of the solar cells 22, which changes with variations in solar radiation 28 intensity and battery charge conditions. The insolation circuit 20 compensates for mismatched load conditions by using a "low-loss" current reducing or limiting technique by changing the duty cycle of a "pulse modulator controller" 30 utilized as part of a DC—DC converter 32. In doing so, the low impedance load (or battery) 24 appears to have a higher impedance at the solar cell source 22 since the current requirements have lessened. Thus, less voltage will be dropped across the series resistance of the solar cell 22 and the voltage across the solar cell terminals will cease to droop and return to a value near the open cell voltage (2.0 volts as an example in this case) which is at or near the maximum power point of the solar cell.

Referring once again to FIG. 1, the insolation circuit 20 utilizes a voltage-input comparitor 34 for generating an error signal 44 based on a solar cell reference voltage for input into the pulse modulator controller 30. The error signal 44 is generated by comparing a solar cell reference voltage 36 adjusted by resistor dividers 38 and 40 to a zener diode 42 voltage reference as inputs into the voltage input comparitor 34. The pulse modulator controller 30 receives the output or error signal 44 from the voltage input comparitor 34 and controls or changes its duty cycle based on this error signal for low-loss current limiting. As shown in FIG. 3, the pulse modulator controller 30 controls a high-speed switch 46 in association with a synchronous rectifier 48 for low-loss current rectification, as will be more fully explained below. The combination of the pulse modulator controller 30, the high-speed switch 46 and synchronous rectifier 48 make up the DC—DC converter 32 for use in the present invention.

By way of example but not of limitation, the high-frequency switch 46 may be an N-channel MOSFET switching transistor whose gate 50 is connected to the pulse modulator 30, source 52 connected to the synchronous rectifier 48 and drain 54 grounded. Also, by way of example but not of limitation, the synchronous rectifier 48 may be a P-channel MOSFET whose gate 56 is connected to pulse controller modulator 30. A Schottky diode 58 is connected in parallel with the synchronous rectifier 48 and is used in low voltage start-ups (below one volt). It carries current at the beginning and end of the synchronous rectifier cycle.

In operation, resistors 38 and 40 divide the voltage from the solar cells 22 and compare it to the set reference voltage 42 at the voltage input comparitor 34. The set reference voltage 42 is determined by finding the maximum power point of the solar cells 22 by varying the solar array load impedance (or resistance) while measuring power and maintaining the solar cells 22 at operating temperature in full sun or equivalent. As the angle of the sun 26 changes or the battery charge condition changes, the divided voltage from the solar cells 22 begins to drop below the set reference value. The voltage input comparitor 34 gives an error signal 44 that lowers the duty cycle of the pulse modulator controller 30. This effectively decreases the load on the solar cells 22 by reducing the current to the load 24. The result is a reduced voltage drop across the series resistance of the solar cells 22 which effectively increases the output voltage of the solar cells 22 to the DC—DC converter 32. In this manner, the solar cells 22 output voltage is regulated and maintained in reference to the set point. Therefore, the maximum power point for such a supply is achieved at a compliance voltage that is an almost constant voltage.

Next, duty cycle control 68 is provided for sensing the voltage at the output 44 from the voltage input comparitor 34 and using this sensed voltage to control the duty cycle of the switching transistor 46. The output from the switching transistor 46 is coupled to an inductor 60 to store energy during the first cycle in a magnetic field of the duty cycle. The collapse of the magnetic field generates a higher electromotive force and thus serves as a voltage boost converter. A low effective series resistance (ESR) capacitor provides low impedance storage ballast for the inductor 60. The duty cycle control 68, responsive to the sensed voltage, controls the duty cycle of the switching transistor 46 in such a manner as to maintain the input voltage approximately constant and thus to maintain the solar cells 22 at or near their peak power operating point.

More specifically, during DC—DC converter operation, the internal N-channel MOSFET switch 46 turns on for the first part of each cycle of the duty cycle in the pulse modulator controller 30, allowing current to ramp up in the inductor 60 with the use of capacitor 62 and store energy in its magnetic field. During the second part of each cycle of the duty cycle of the pulse modulator controller 30, the N-channel MOSFET switch 46 turns off and inductor current flows through the synchronous rectifier 48 to an output filter capacitor 64 and the load 24. As the energy stored in the inductor 60 is depleted, the current ramps down and the synchronous rectifier 48 turns off, the N-channel MOSFET switch 46 turns on and the cycle repeats. The input voltage is regulated using a combination of both pulse width and frequency modulation by the pulse modulator controller 30. Additionally, the output voltage is regulated so as not to overcharge the battery 24 by the use of a voltage-output regulator 70 which disables the modulator controller 30 at an enable port 78. Comparing the output voltage through voltage dividers 74 and 76 to a zener diode 72 voltage reference sets the limit of the output voltage of the pulse modulator controller 30 to the battery 24. Lastly, as shown in FIG. 1, a back flow diode 66 is connected between the DC—DC converter 32 and load 24 providing reverse current protection and preventing unwanted drain from the battery or load 24.

Figure 2:
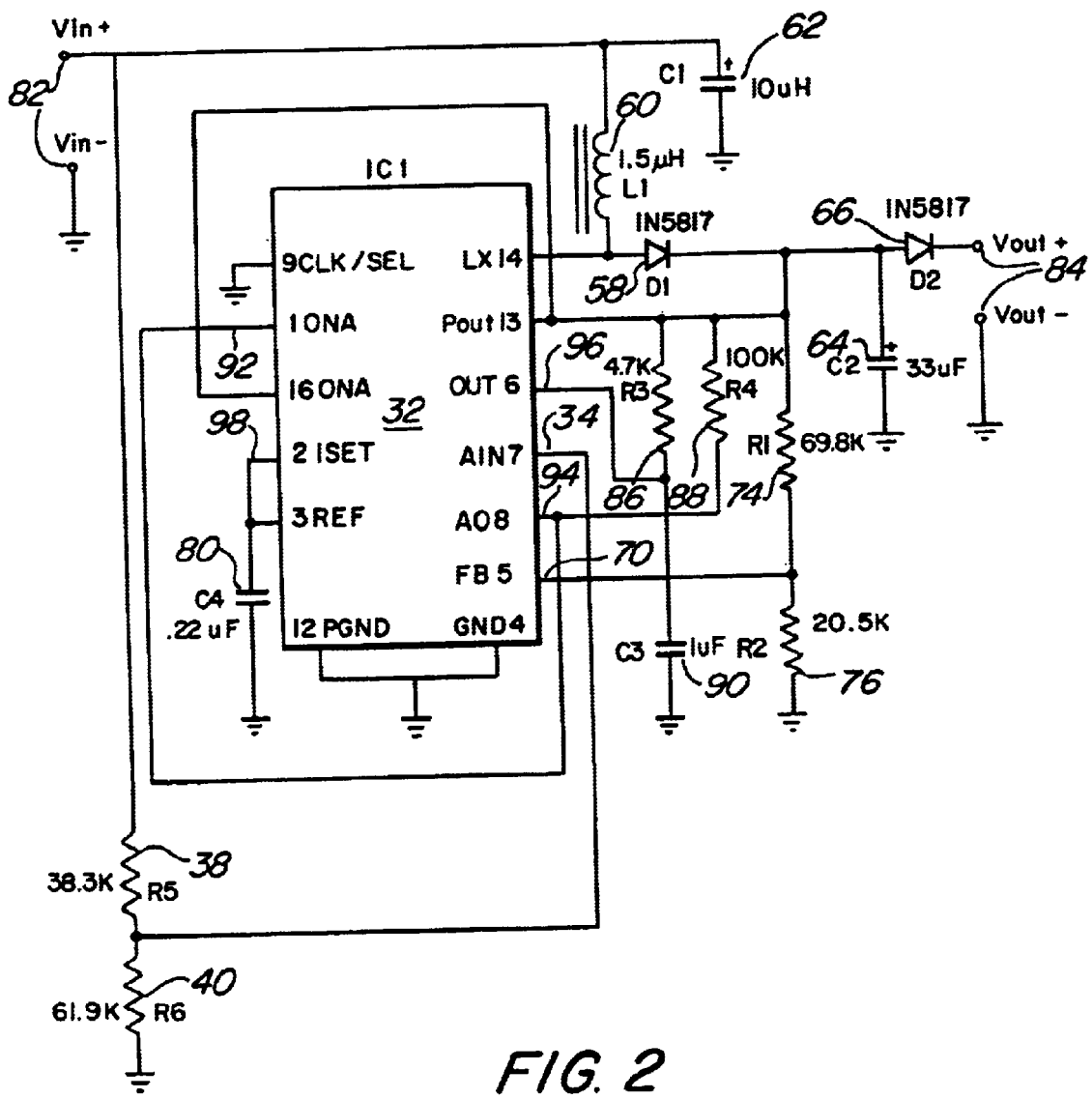
FIG. 2 is a detailed electrical schematic diagram of an insolation circuit in accordance with the present invention.

Referring now to FIG. 2, there is shown a detailed schematic diagram of one example of a voltage regulation micro-solar insolation circuit 20 using commercially available components. In this embodiment, a Maxim Integrated Products 1763 DC—DC converter integrated circuit chip 32 was chosen due to its high conversion efficiency (typically measured at about 95%) and an unspecified characteristic that the duty cycle of its internal pulse width modulator can be controlled by a variable DC voltage at the ONA port 68. The micro-solar isolation circuit 20 uses the ONA port (pin 1) 92 to control the duty cycle of an imbedded DC—DC converter within the integrated circuit chip 32 to regulate the input voltage as described below using the principle detailed above with reference to similar component numbering shown in FIG. 1.

Referring once again to FIG. 2, fifth and sixth resistors (R5 and R6) 38 and 40 respectively, are used as part of the voltage divider that provides the solar cell reference voltage to an internal comparitor at AIN port (pin 7) 34. In the embodiment shown in FIG. 4 the fifth and sixth resistor 38, 40 are preferably 38.3K and 61.9K Ohms respectively. As solar energy decreases, the internal series resistance of the solar cell increases. The voltage at the cell output 82 begins to drop. The divided voltage from the solar cell drops below the reference value. The internal comparitor gives an error signal that lowers the duty cycle of an internal pulse width modulator within integrated circuit chip 32 via port AO (pin 8) 94 to port ONA (pin 1) 92. This effectively decreases the load on the solar cell by reducing the current to the load. This results in a reduced voltage drop across the series resistance of the solar cell, which effectively increases the output voltage of the cell to the DC—DC converter. In this manner the solar cell output voltage is regulated and maintained near the optimum power point by referencing to the set point of the internal comparitor.

A 1.5 Micro-Henry inductor (L1) 60 is used to store energy during the first cycle of the duty cycle in its magnetic field. As explained above, the collapse of the magnetic field generates a higher electromotive force and thus serves as a voltage boost converter. A 10 Microfarad low ESR (0.1 ohm) Capacitor (C1) 62 provides a low impedance charge storage ballast for the inductor (L1) 60. A 33 Microfarad low ESR (0.1 ohm) Capacitor (C2) 64 serves as an output storage and filtering device for the rectified output of the inductor (L1) 60 and a 1 Microfarad Capacitor (C3) 90 serves as a filter for the internal undervoltage lockout at port OUT (pin 6) 96. A 0.22 Microfarad Capacitor (C4) 89 is used on the inductor maximum current set ISET (pin 2) 98 as a reference voltage ballast supply. A Schottky Diode (D1) 1N5817 58 is used in low voltage start-ups (below 1 volt). It carries current at the beginning and end of the synchronous rectifier cycle. A second Schottky Diode (D2) 1N5817 66 is used to eliminate reverse current to prevent discharge of the battery when no current from the solar cell is available. First and second resistors (R1 and R2) 74 and 76 respectively, are used as part of a voltage divider that provides a output reference voltage to an internal comparitor at the FB port (pin 5) 70. In the embodiment shown in FIG. 2 the first and second resistors (R1 and R2) 74, 76 are preferably 69.8K and 20.5K Ohms respectively. The first and second resistors (R1 and R2) 74, 76 are used a part of a voltage divider to limit the output voltage of the DC—DC converter/charger. A third resistor (R3) 86, preferably 4.7K Ohms, serves as voltage sample for the internal undervoltage lockout at the OUT port (pin 6) 96. A fourth resistor (R4) 88, preferably 100K Ohms serves as a current supply or pull-up resistor for an internal transconductance amplifier that is used to control ONA.

A micro-solar insolation circuit having a DC—DC converter used to transfer the power available from a solar cell source, at a value close to its optimum, to a load is provided. One skilled in the art will appreciate that the present invention can be practiced by other than the description provided, which is presented for purposes of illustration and not limitation, and the present invention is limited only by the claims that follow.

What is claimed is:

1. A micro-solar insolation circuit comprising:
    a comparator for generating an error signal based on a solar cell reference voltage;
    a modulator controller for receiving said error signal wherein said modulator controller controls a duty cycle based on said error signal for low loss current limiting; wherein said modulator controller controls a high speed switch in association with a synchronous rectifier for low loss current rectification.

2. The micro-solar insolation circuit of claim 1 wherein said duty cycle of said modulator controller is pulse width modulated.

3. The micro-solar insolation circuit of claim 1 wherein said duty cycle of said modulator controller is frequency modulated.

4. The micro-solar insolation circuit of claim 1 wherein said high speed switch is a N channel MOSFET.

5. The micro-solar insolation circuit of claim 1 wherein said synchronous rectifier is a P channel MOSFET.

6. The micro-solar insolation circuit of claim 1 wherein said comparator generates said error signal by comparing said solar cell reference voltage to a zener diode voltage reference.

7. The micro-solar insolation circuit of claim 1 wherein said solar cell reference voltage is adjusted by a resistor divider.

8. The micro-solar insolation circuit of claim 1 further comprising a back flow diode.

9. The micro-solar insolation circuit of claim 1 wherein said solar cell reference voltage is determined by finding operating temperature at full sun.

10. A micro-solar insolation circuit comprising:
    a solar cell array defining a reference voltage;
    a comparator for generating an error signal based on said solar cell reference voltage;
    a modulator controller for receiving said error signal wherein said modulator controller changes a duty cycle based on said error signal for low loss current limiting; and
    a high speed switch in association with a synchronous rectifier for allowing current to ramp up in an inductor based on said duty cycle for low loss current rectification to a load.

11. The micro-solar insolation circuit of claim 10 wherein said duty cycle of said modulator controller is pulse width modulated.

12. The micro-solar insolation circuit of claim 10 wherein said duty cycle of said modulator controller is frequency modulated.

13. The micro-solar insolation circuit of claim 10 wherein said high speed switch is a N channel MOSFET.

14. The micro-solar insolation circuit of claim 10 wherein said synchronous rectifier is a P channel MOSFET.

15. The micro-solar insolation circuit of claim 10 wherein said comparator generates said error signal by comparing said solar cell reference voltage to a zener diode voltage reference.

16. The micro-solar insolation circuit of claim 10 wherein said solar cell reference voltage is adjusted by a resistor divider.

17. The micro-solar insolation circuit of claim 1 further comprising a back flow diode.

18. A micro-solar insolation circuit comprising:
    a solar cell array defining a reference voltage;
    a comparator for generating an error signal based on said solar cell reference voltage;
    a modulator controller for receiving said error signal wherein said modulator controller changes a duty cycle based on said error signal for low loss current limiting wherein said modulator controller is pulse width and frequency modulated; and
    a high speed switch in association with a synchronous rectifier for allowing current to ramp up in an inductor based on said duty cycle for low loss current rectification to a load.

19. The micro-solar insolation circuit of claim 10 wherein said high speed switch is a N channel MOSFET.

20. The micro-solar insolation circuit of claim 10 wherein said synchronous rectifier is a P channel MOSFET.

* * * * *